United States Patent [19]
Nidata et al.

[11] Patent Number: 5,911,634
[45] Date of Patent: Jun. 15, 1999

[54] TILTABLE PLATFORM

[76] Inventors: Gary Nidata, 845 Sydney, Brossard, Quebec, Canada, J4X 2B8; Richard T. Nidata, 8765 Rivard Blvd., Brossard, Quebec, Canada, J4X 1W2

[21] Appl. No.: 09/034,413

[22] Filed: Mar. 4, 1998

[51] Int. Cl.⁶ .................................................. A63G 31/16
[52] U.S. Cl. ........................................... 472/59; 434/55
[58] Field of Search ............................. 472/59, 60, 130, 472/131, 61; 434/29, 55; 463/36, 37, 38

[56] References Cited

U.S. PATENT DOCUMENTS

| | | | |
|---|---|---|---|
| 1,789,680 | 1/1931 | Gwinnett | 472/60 |
| 2,661,954 | 12/1953 | Koci | 463/36 |
| 3,923,300 | 12/1975 | Tanus | 472/59 |
| 4,856,771 | 8/1989 | Nelson et al. | 472/60 |
| 5,009,412 | 4/1991 | Roodenburg et al. | 472/59 |
| 5,195,746 | 3/1993 | Boyd et al. | 463/37 |
| 5,533,933 | 7/1996 | Garnjost et al. | 472/60 |
| 5,551,920 | 9/1996 | Ogden et al. | 472/59 |

*Primary Examiner*—Kien T. Nguyen
*Attorney, Agent, or Firm*—Eric Fincham

[57] ABSTRACT

There is provided a motion simulator comprising a platform mounted on a base, the platform being mounted by a multi directional swivel connection with first and second motion actuators situated proximate first and second sides of the platform. Each motion actuator comprises a motor, a shaft rotatably driven by the motor and a cam member mounted on the shaft. A roller is mounted on the cam member and is associated with a follower mounted on the platform, the arrangement being such that rotation of the shaft and the cam will cause the roller to move within the follower and cause vertical movement of the platform proximate the follower. The platform can thus move in a vertical plane and also have rotational movement about an axis extending longitudinally of the platform.

10 Claims, 6 Drawing Sheets

TILTABLE PLATFORM

BACKGROUND OF THE INVENTION

The present invention relates to video game systems and in particular, to motion simulators therefore.

The use of motion in conjunction with various game apparatus and particularly video games is well known in the art. The use of motion in conjunction with video displays other than for games is also known—i.e. in various types of simulators for planes and ground vehicles, motion generating devices are commonly utilized.

Thus, U.S. Pat. No. 4,066,256 discloses a ride for an amusement park wherein hydraulic rams are utilized to move the passengers who are seated in a vehicle. The arrangement is a relatively standard one wherein the hydraulic rams may be employed to tilt the vehicle in different directions.

U.S. Pat. No. 5,662,523 discloses a game apparatus having a plurality of video display devices for each of a plurality of players with separate units for controlling the video display of the corresponding video display device. A position sensor detects positions of movements of the players and based on the position information about one player, the player control units for the other players control the corresponding display device to give the change to the video watched by the other players.

A video game/simulator system is also shown in U.S. Pat. No. 5,551,701 wherein the system may be used in conjunction with a personal computer. The unit includes a joy stick, as well as a keyboard and foot pedals. The unit may be used with the game board of a personal computer.

U.S. Pat. No. 5,564,985 discloses a system for experiencing a recording wherein a seat is provided which is operated by pneumatic cylinders. The unit may be used in conjunction with video displayed on a screen which moves in the same plane as the seat.

While the above patents teach various types of motion generating devices for use with chairs or seats, the use of such chairs or seats in a residential application has not become popular possibly due to the lack of a suitable device for a residential environment.

SUMMARY OF THE INVENTION

It is an object of the present invention to provide a motion simulator suitable for use with a video display and which motion simulator is reliable and suitable for residential use.

It is a further object of the present invention to provide a motion simulator which is relatively simple to construct and inexpensive.

It is a further object of the present invention to provide a tiltable platform suitable for use as a base in a motion simulator.

According to one aspect of the present invention, there is provided a motion simulator which comprises a base, a platform mounted on the base, the platform being mounted by a multi directional swivel connection, first and second motion actuators situated proximate first and second sides of the platform. Each motion actuator comprises a motor, a shaft rotatably driven by the motor and a cam member mounted on the shaft. A roller is mounted on the cam member and is associated with a follower mounted on the platform, the arrangement being such that rotation of the shaft and the cam will cause the roller to move within the follower and cause vertical movement of the platform proximate the follower.

In greater detail, the motion simulator of the present invention is designed to impart motion based on suitable input from any desired source. The input may, for example, be in response to actions taken by the user—i.e. motion of joy stick, foot pedals, etc. Alternatively, the input may come from external source such as a video game or other players of the game.

Suitable inputs for the same may be provided by either serial or parallel interface to the onboard computer.

The tiltable platform is mounted on a base in a three point T shaped arrangement. The base of the T comprises a swivel joint which permits movement thereabout in two planes and combinations thereof. Any suitable type of joint may be employed such as a universal joint, ball joint, etc.

At each end of the T shape mounting arrangement, there is provided a motion actuator which is designed to provide vertical movement of the platform. The vertical movement and the relative rate thereof of one actuator with respect to the other will provide the side to side tilting motion.

In a preferred embodiment, the motion apparatus uses a ball joint situated proximate the location of the chair and a pair of electrically driven actuators, one of each actuator being located proximate a corner of the platform.

The motion apparatus may include a number of accessories which will be mounted on the simulator. Thus, arrangements may be made for the mounting of conventional joy sticks, foot controls, monitor, steering wheel, etc.

In a preferred arrangement, the input which, as aforementioned, might be either a direct control or a program, will determine the X and Y orientation. Additional information with respect to the actual position of the actuators may be obtained from feedback sensors and this position is compared with a desired position. The actuator drivers are then actuated to move in the appropriate direction.

BRIEF DESCRIPTION OF THE DRAWINGS

Having thus generally described the invention, reference will be made to the accompanying drawings illustrating an embodiment thereof, in which:

FIG. 4 is a top plan view thereof;

DESCRIPTION OF THE PREFERRED EMBODIMENTS

Figure 1:
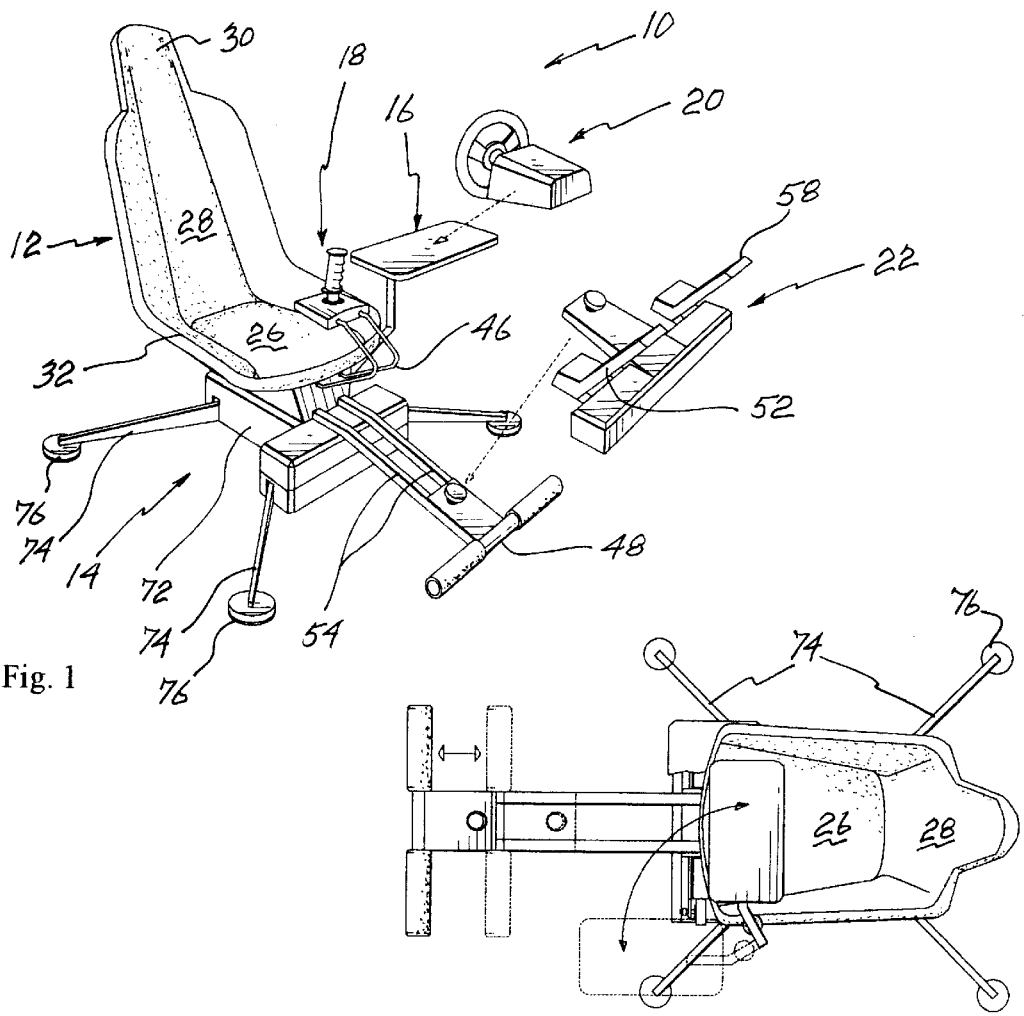
FIG. 1 is a perspective, partially exploded view of simulator apparatus according to the present invention.
Figures 2, 3:
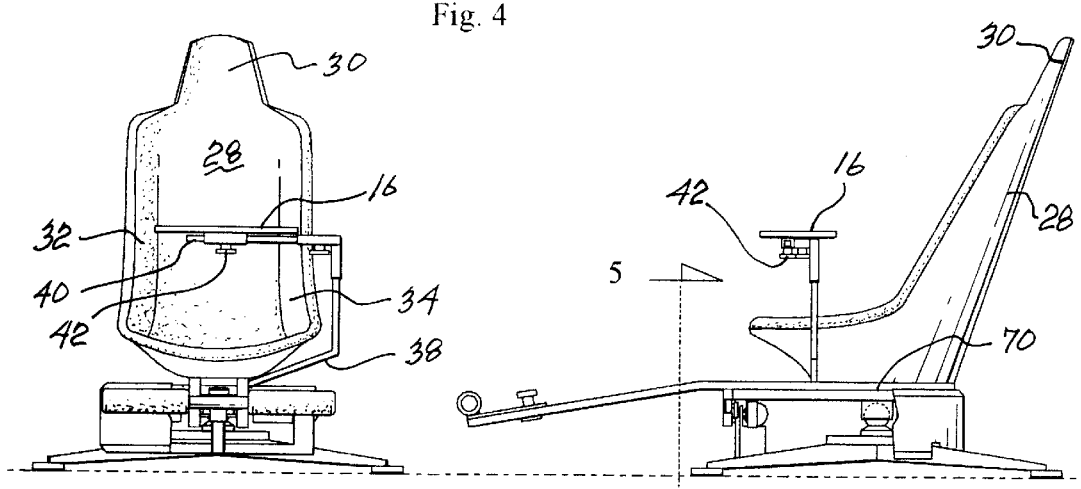
FIG. 2 is a front elevational view thereof.
FIG. 3 is a side elevational view thereof.
Figure 5:
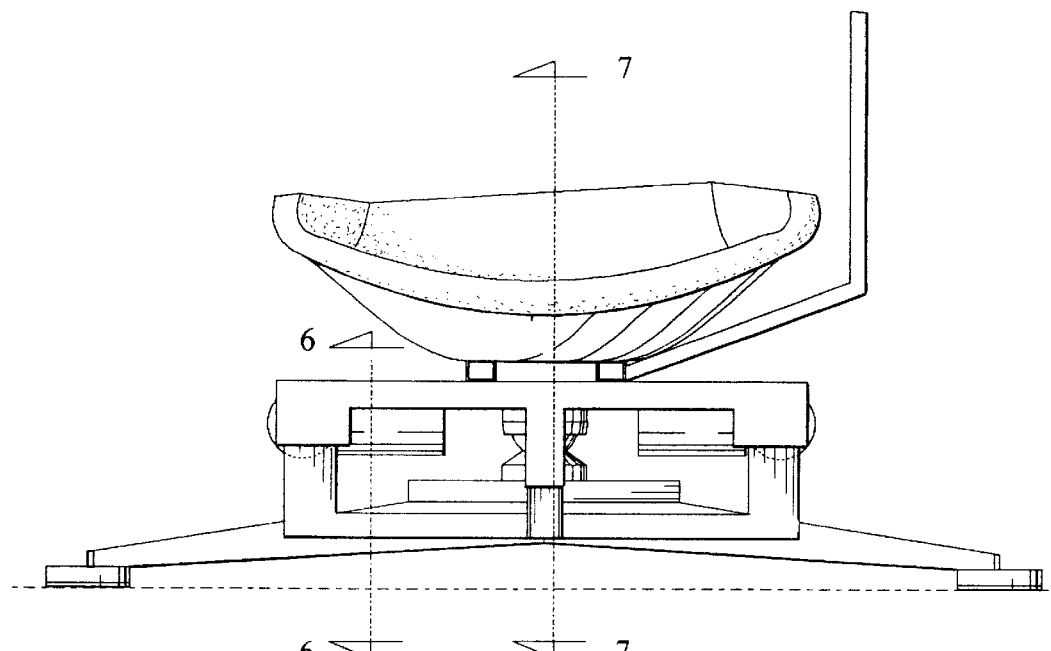
FIG. 5 is a view taken along the lines 5—5 of FIG. 3.
Figure 6:
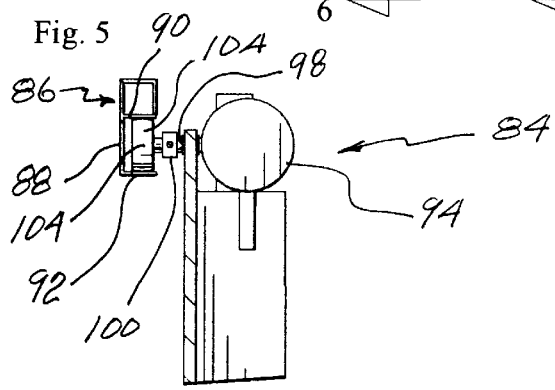
FIG. 6 is a view taken along the lines 6—6 of FIG. 5.
Figure 7:
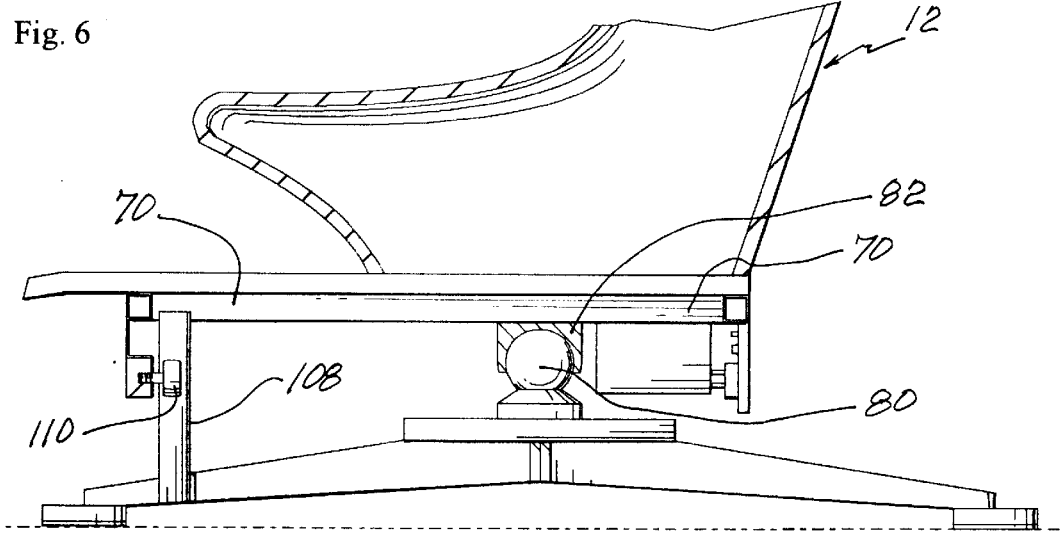
FIG. 7 is a sectional view taken along the lines 7—7 of FIG. 5.
Figure 8:
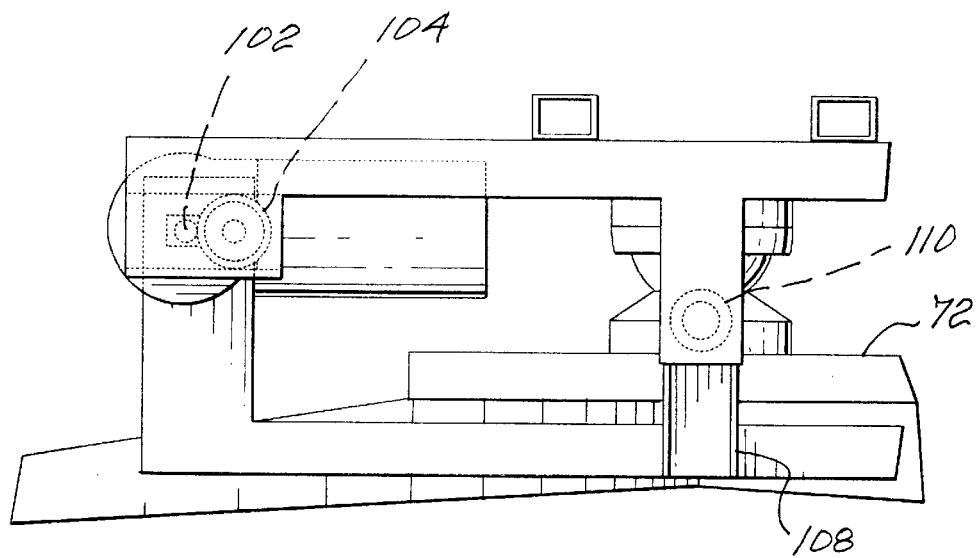
FIG. 8 is a partial front elevational view showing an actuator and center guide.
Figure 9:
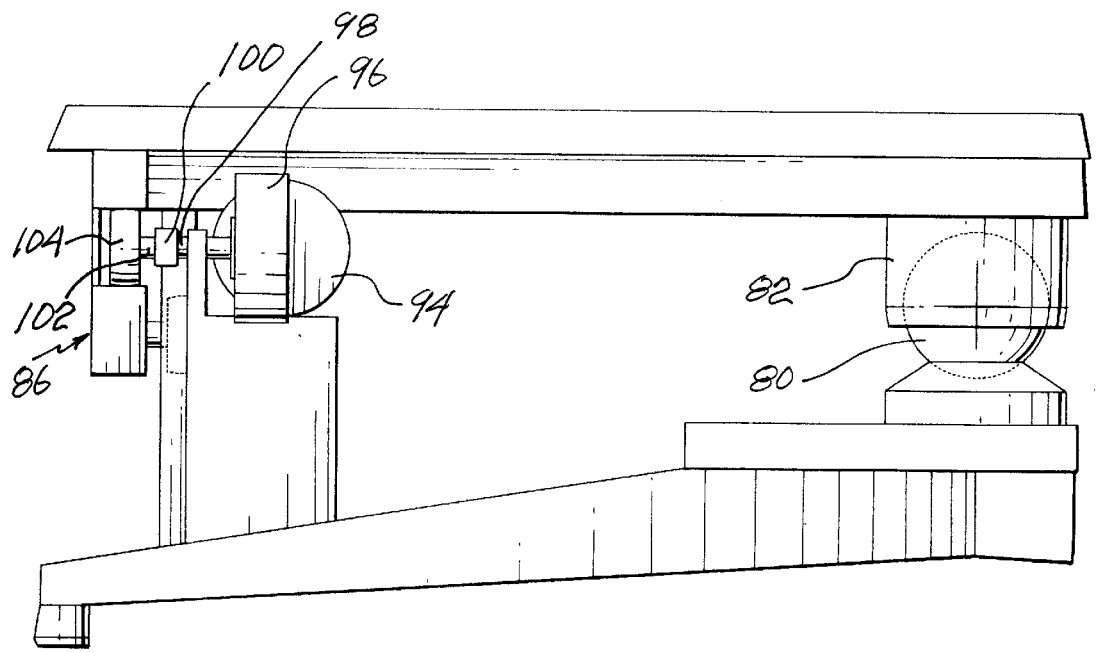
FIG. 9 is a partial side elevational view of an actuator and swivel mount.

Referring to the drawing in greater detail and by reference characters thereof, there is illustrated a simulator apparatus which is generally designated by reference numeral 10. Simulator apparatus 10 includes a chair 12 mounted on a base unit which is generally designated by reference numeral 14. Simulator apparatus 10 also includes a table 16, a joy stick device 18, a steering wheel 20, and foot controls 22.

Chair 12 is a single piece molded chair having a seat 26, a back portion 28 incorporating a head rest 30, and a pair of side portions 32 and 34.

Table 16 is mounted by means of support arms; a lower portion 38 terminates in a horizontally extending portion 40. A securing member 42 may be used in a conventional manner to hold table 16 in a desired position.

Joy stick device 18 is likewise mounted on a pair of support arms 46 extending outwardly and upwardly from under chair 12.

Extending outwardly from base unit 14 are a pair of lower support arms 54 which can receive a foot rest 48. Foot controls 22 are also designed to be mounted on support arms 54 and as is conventional, may include a pair of foot pedals 50 and 52.

A platform 70 supporting chair 12 is mounted on top of base 72. Base 72 is supported by a plurality of outwardly extending legs 74 which terminate in pads 76.

Extending upwardly from base 72 are a first mounting means comprising a ball 80 designed to seat within socket 82 which is mounted on platform 70 and which is located below chair 12. The arrangement will thus permit multi directional tilting movement about the ball and socket joint 80, 82.

Platform 70 is tiltable by actuators mounted proximate the front corners of the platform. Each of the actuators, generally designated by reference numeral 84 is substantially similar and thus only one will be described herein with similar reference numerals being employed for the other actuator.

Mounted on the bottom surface of platform 70 is a C-shaped guide channel 86 having a back wall 88, a top wall 90 and a bottom wall 92 which defines between them the channel.

Mounted on base 72 is a motor 94 which is operatively connected to a gear box 96 from which extends gear box shaft 98. Mounted on shaft 98 is a cam 100 and which cam has a roller connector arm 102 connected to roller 104.

Actuation of motor 94 will cause rotation of shaft 98 and movement of roller 104. As roller 104 is contained within C shaped guide channel 86, movement therealong will cause an upward/downward movement of that portion of the platform. A similar arrangement is provided with respect to the other actuator.

Located intermediate actuators 84 is a center channel 108 which is fixed to base 72. Extending downwardly from platform 70 is a center guide having a center guide roller 110 mounted thereto. Center guide roller 110 is mounted within center channel 108.

Figure 10:
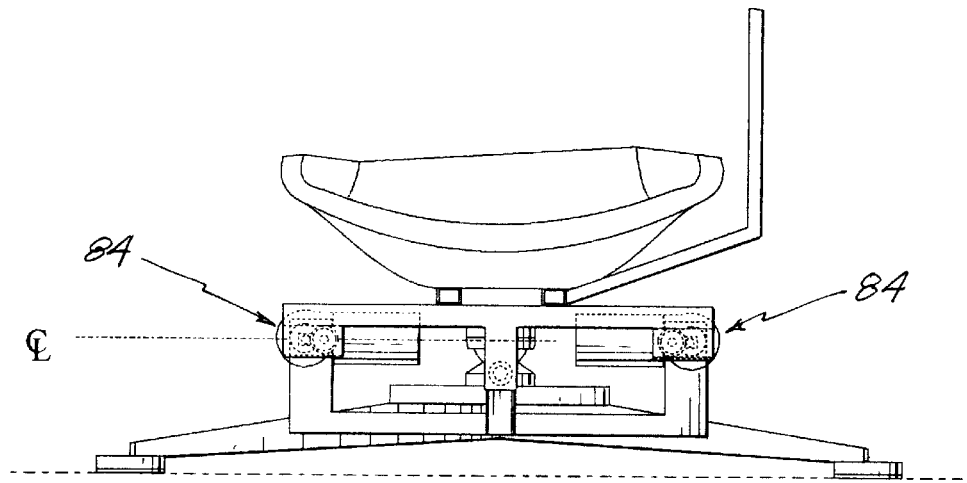
FIGS. 10, 11 and 12 are front views illustrating movement of the tiltable platform in side to side direction.
Figure 11:
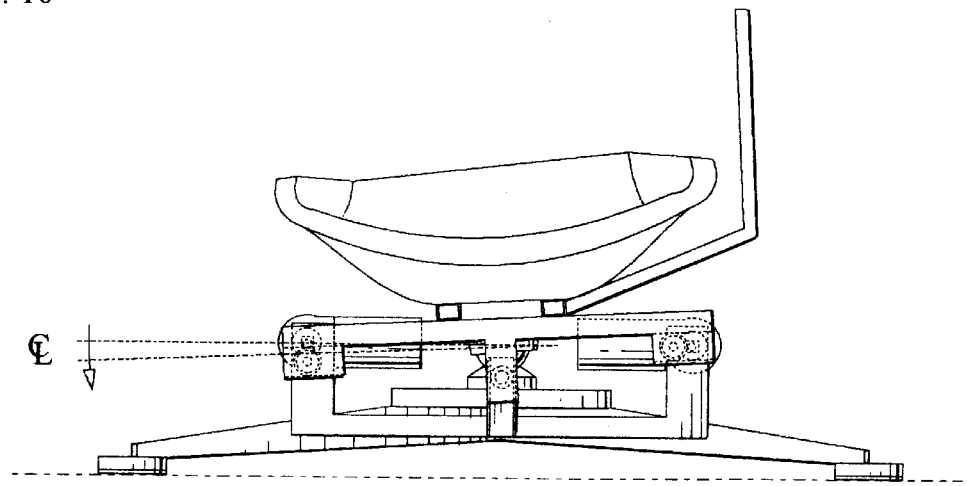
Figure 12:
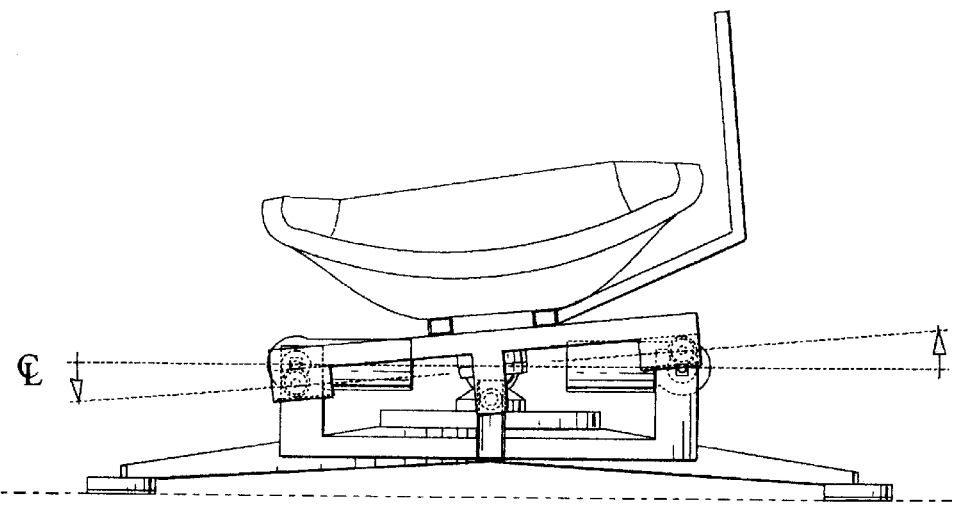

The above arrangement permits movement of the apparatus in a vertical plane and rotational movement about a longitudinal axis. Thus, as shown in FIG. 10, the actuators 84 are positioned such that the platform is in a substantially horizontal position. Movement of a single actuator may cause movement about a horizontal axis while movement of the other actuator will increase the degree of movement shown in FIG. 12.

Figure 13:
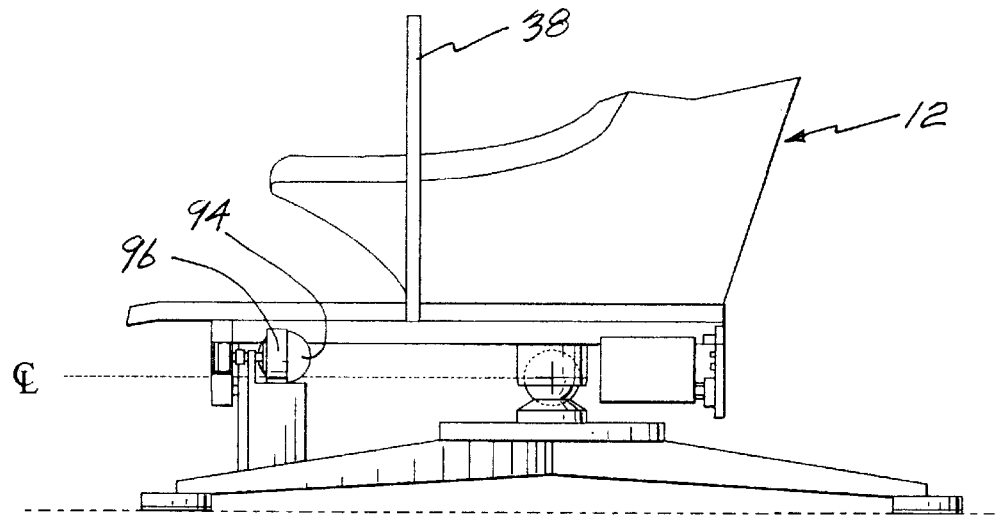
FIGS. 13, 14 and 15 are side views illustrating tiltable movement of the platform in a front to back motion.
Figure 14:
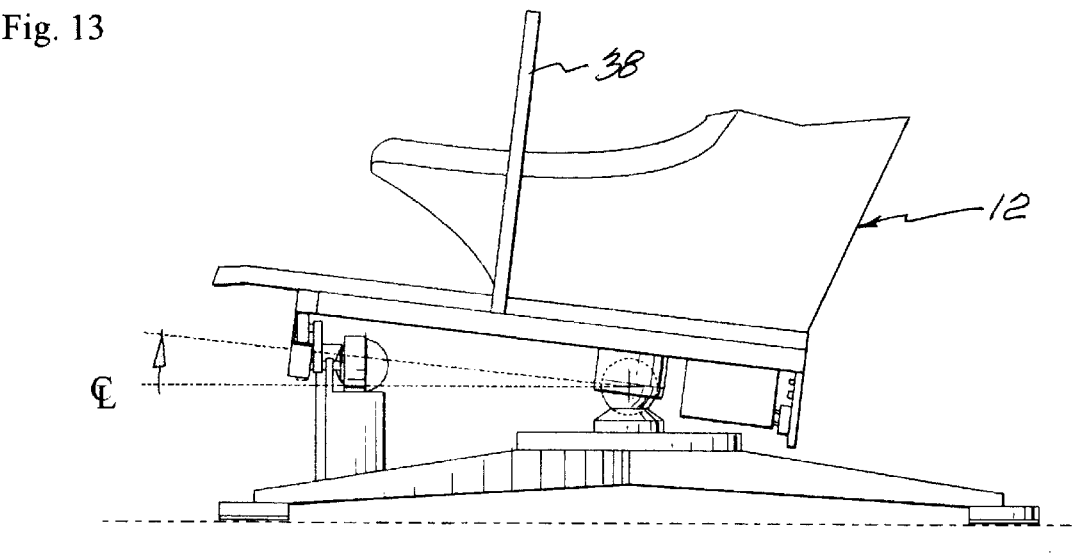
Figure 15:
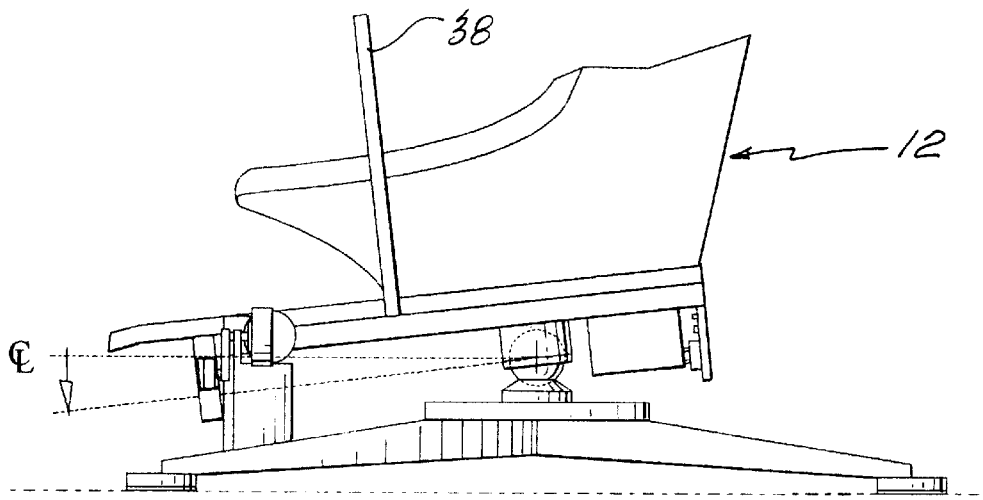

FIG. 13 is a side elevational view showing the platform in the horizontal position of FIG. 10 while in FIG. 14, both actuators 84 have been operated to move the front of the platform in an upward direction. FIG. 15 illustrates movement of the actuators 84 to cause downward movement of the front of the platform. In use, combination of the above movements would normally be utilized.

Figure 16:
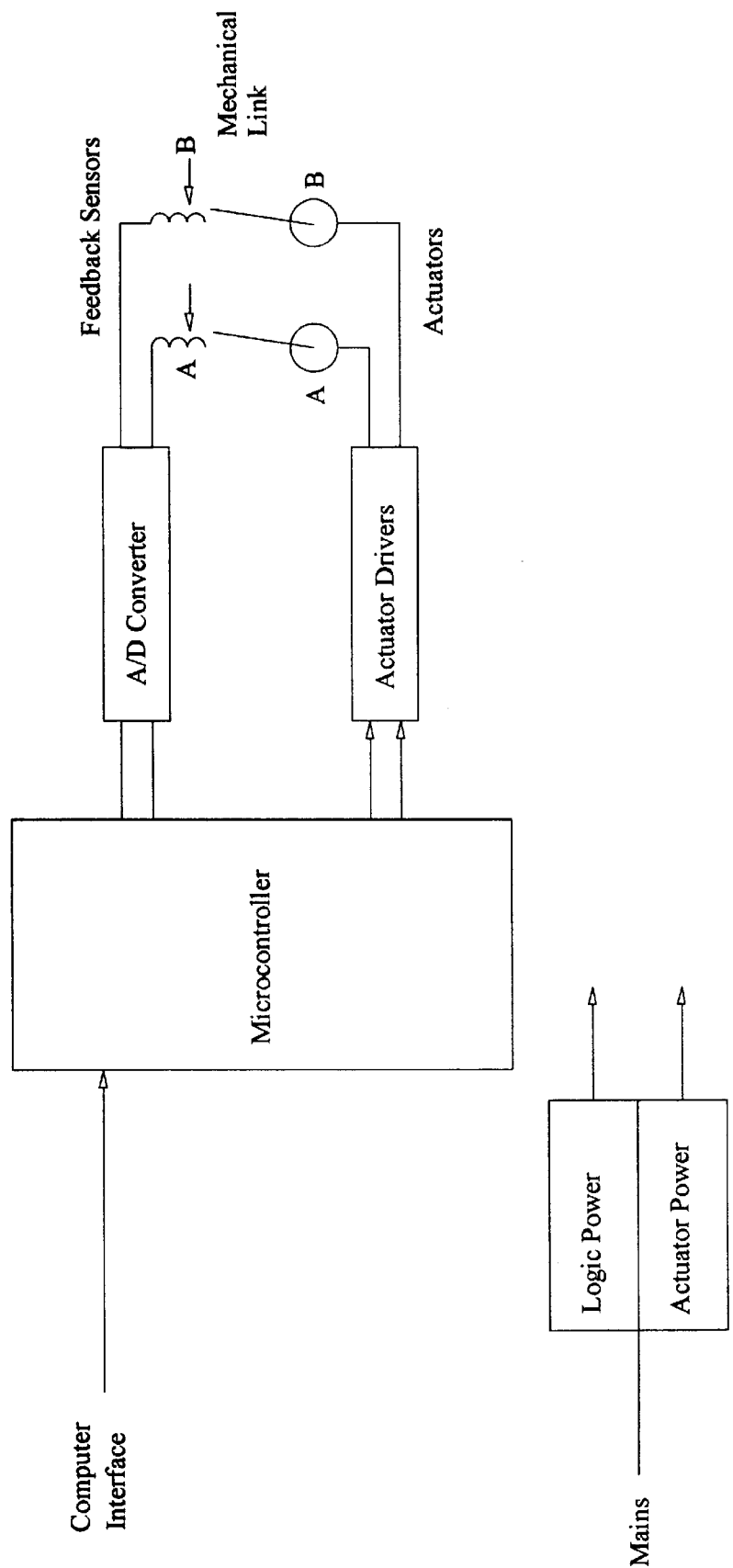
FIG. 16 is a schematic view of the electrical controls.

Turning to FIG. 16, the application program which might be a game or other input running in the control computer determines the desired X and Y orientation of the platform. This information is transmitted by a suitable interface which may be either serial or parallel to the micro controller. An algorithm in the micro controller transforms this X/Y position into A and B values which represent the position that the different actuators much attain to result in the proper X/Y position of the platform. This conversion algorithm is dependent on the physical relationship between the actuators and the platform pivot point.

At this time, A and B positional information is obtained from feedback sensors mechanically linked to the actuators. It is converted by analog to digital converters and read into the micro controller. The desired position from the control computer is compared with the current position from the feedback sensors and an error value is calculated. If this value is 0, the actuator drivers are instructed to enter a brake state to hold the current position. Alternatively, if the error value is either positive or negative, the drivers are set to drive the actuators in the appropriate direction required to reduce the error to 0. In addition, the magnitude of the error determines the amount of power the drivers will deliver to the actuators. This process can be repeated several times per second.

It will be understood that the above described embodiments are for purposes of illustration only and that changes and modifications may be made thereto without departing from the spirit and scope of the invention.

We claim:

1. A motion simulator comprising a base, a platform, said platform being mounted on said base by a multi-directional swivel connection, first and second motion actuators situated proximate first and second sides of said platform, each of said motion actuators comprising a motor, a shaft rotatably driven by said motor, a cam member mounted on said shaft, a roller mounted on said cam member, a follower mounted on said platform, the arrangement being such that rotation of said shaft and cam will cause said roller to move horizontally within said follower and cause vertical movement of said platform proximate said follower.

2. The motion simulator of claim 1 wherein said multi directional swivel connection comprises a ball joint.

3. The motion simulator of claim 1 further including a chair mounted on said platform, said chair being mounted proximate said multi directional swivel connection.

4. The motion simulator of claim 1 further comprising guide means mounted between said first and second motion actuators, said guide means maintaining said platform in a fixed vertical plane to prevent horizontal movement in a horizontal plane.

5. The motion simulator of claim 4 wherein said guide means comprises a vertically extending channel secured to said base, a roller attached to said platform, said roller being moveable within said vertical channel.

6. The motion simulator of claim 1 further including a joy stick and joy stick mounting means, said joy stick mounting means being secured to said base.

7. The motion simulator of claim 1 further including a table and table mounting means, said table mounting means being secured to said base, said table mounting means being totally moveable to move said table into and out of a desired position.

8. The motion simulator of claim 1 further including foot controls and foot control mounting means, said foot control mounting means extending outward from said base.

9. The motion simulator of claim 1 wherein said follower mounted on said platform comprises a C shaped channel extending horizontally along a bottom of said platform.

10. The motion simulator of claim 1 further including a feedback sensor associated with each motion actuator, said feedback sensor providing information on the location of said platform adjacent said motor actuator.

* * * * *